(12) United States Patent
Tao et al.

(10) Patent No.: US 7,543,525 B2
(45) Date of Patent: Jun. 9, 2009

(54) AUTOMOBILE CLUTCH BOOSTER

(75) Inventors: Baojian Tao, Ruian (CN); Liu Yang, Ruian (CN)

(73) Assignee: SORL Auto Parts, Inc., Ruian, Zhejiang (CN)

( * ) Notice: Subject to any disclaimer, the term of this patent is extended or adjusted under 35 U.S.C. 154(b) by 307 days.

(21) Appl. No.: 11/637,439

(22) Filed: Dec. 12, 2006

(65) Prior Publication Data
US 2007/0130942 A1 Jun. 14, 2007

(30) Foreign Application Priority Data
Dec. 12, 2005 (CN) ............... 2005 2 0142951 U

(51) Int. Cl.
*F15B 9/10* (2006.01)
*F01B 31/12* (2006.01)
(52) U.S. Cl. ........................... 91/1; 37/374
(58) Field of Classification Search .......... 60/328, 60/547.1, 555, 557; 91/5 R, 1, 374; 92/1, 92/374, 5 R
See application file for complete search history.

(56) References Cited

U.S. PATENT DOCUMENTS

| | | | |
|---|---|---|---|
| 4,378,676 A * | 4/1983 | Parsons et al. ........... 60/555 |
| 4,771,604 A * | 9/1988 | Nakano ................. 92/5 R |
| 4,773,222 A * | 9/1988 | Tanaka et al. ............ 92/5 R |
| 4,871,051 A | 10/1989 | Whitmer |
| 4,955,198 A | 9/1990 | Yanagawa et al. |
| 5,263,403 A | 11/1993 | Choinski et al. |
| 5,311,809 A | 5/1994 | Choinski et al. |
| 5,460,076 A | 10/1995 | Pierce et al. |
| 5,722,311 A | 3/1998 | Pierce et al. |
| 5,937,733 A | 8/1999 | Stojic |
| 5,954,176 A | 9/1999 | Ishihara et al. |
| RE36,955 E | 11/2000 | Pierce et al. |
| 6,148,711 A | 11/2000 | Stojic |
| 6,536,569 B2 * | 3/2003 | Nishimura ............ 192/3.58 |
| 6,585,806 B2 | 7/2003 | Quinn et al. |
| 6,730,143 B1 | 5/2004 | Nichols et al. |
| 6,881,245 B2 | 4/2005 | Nichols et al. |
| 2004/0074721 A1 | 4/2004 | Nichols et al. |
| 2004/0134344 A1 | 7/2004 | Fisher |

* cited by examiner

*Primary Examiner*—Michael Leslie
(74) *Attorney, Agent, or Firm*—Morris, Manning & Martin LLP; Tim Tingkang Xia, Esq.

(57) ABSTRACT

A clutch booster usable for an automobile having a clutch. In one embodiment, the clutch booster includes a booster member coupled with the clutch for engaging or disengaging the clutch from the engine of the vehicle in response to a force applied to the clutch of the vehicle and means for determining the status of the clutch of the automobile.

19 Claims, 5 Drawing Sheets

AUTOMOBILE CLUTCH BOOSTER

CROSS-REFERENCE TO RELATED APPLICATION

This application claims priority of Chinese Patent Application No. 200520142951.9, filed on Dec. 12, 2005, entitled "AUTOMOBILE CLUTCH BOOSTER" by Baojian Tao and Liu Yang, the disclosure of which is incorporated herein by reference in its entirety.

FIELD OF THE INVENTION

The present invention is generally related to an automobile clutch, and, more particularly, is related to an automobile clutch booster having means for determining the status of a clutch of an automobile.

BACKGROUND OF THE INVENTION

A manual transmission for use in an automotive vehicle is generally connected to the engine through a friction clutch whose engagement and disengagement is determined by the manual movement of a clutch pedal, typically controlled by the vehicle driver with his/her foot. Frequent applying the clutch pedal in high density traffic or holding the clutch pedal down during long stops can be fatiguing to the driver.

Therefore, a clutch booster to reduce the effort required to operate such a clutch of a vehicle is desirable. With hydraulic assistance the disengagement of the vehicle's transmission can be easily accomplished.

A conventional clutch booster is generally designed to convert the stamp-down force on the clutch pedal of an automobile into a corresponding hydraulic pressure by way of a master cylinder incorporated in the hydraulic clutch system. With this construction, it is essentially required to adapt the master cylinder and the hydraulic piping therefor in the hydraulic clutch system, or to provide the clutch booster with a hydraulic cylinder, and the like, which would naturally make this system complicated substantially in its mechanical construction, and consequently, result in an economical disadvantage in its production cost.

Additionally, clutches generally have a plurality of plates with friction engaging surfaces that transmit torque when the clutch plates (discs) are compressed and interrupt torque transfer when pressure is released from the clutch plates. All clutches are subject to wear over time and require adjustment to provide a desired clutch engagement position for optimal performance.

Clutch boosters with the abilities of either automatically or manually adjusting clutches have been developed. However, automatically adjusting clutches require complicated mechanical linkages that add cost to the clutch assembly. Automatically adjusting clutches also require additional parts that add weight and may complicate clutch operation. Manually adjusted clutches may provide the optimal performance associated with a properly adjusted clutch but require periodic manual adjustments. In addition, it is difficult to determine the extent of clutch wear without disassembling the clutch with most clutch assemblies.

Improvements are made by measuring the amount of clutch wearing and providing such clutch boosters with an externally visible indication of clutch wearing. Further, when the amount of clutch wearing is greater than a predetermined value, the clutch boosters will a warning or alarm signal, indicating that the clutch plates need to be adjusted or replaced. However, such a clutch wearing measurement is not accurate and may not stand for the actually clutch wearing in a clutch system. On the other hand, maintaining and/or repairing the clutch system need specialists, and are very costly.

Therefore, a heretofore unaddressed need exists in the art to address the aforementioned deficiencies and inadequacies.

SUMMARY OF THE INVENTION

In one aspect, the present invention relates to a clutch booster usable for an automobile having a clutch. In one embodiment, the clutch booster includes a booster cylinder having a first end portion and an opposite, second end portion defining a booster cylinder chamber therebetween, and an assistance cylinder having a first end portion and an opposite, second end portion defining an assistance cylinder chamber therebetween, where the first end portion of the assistance cylinder is mounted onto the second end portion of the booster cylinder and the second end portion of the assistance cylinder is formed with an opening that is in fluid communication with a hydraulic clutch pump. The booster cylinder has an axis, and the assistance cylinder has an axis. In one embodiment, the axis of the assistance cylinder is substantially coincident with the axis of the booster cylinder. The assistance cylinder and the booster cylinder are arranged in tandem.

The clutch booster further includes a piston plate having a first side and an opposite, second side, configured to be positioned in the booster cylinder chamber to divide the booster cylinder chamber into a first chamber portion and a second chamber portion; a piston rod having a first end portion mounted onto the second side of the piston plate, and an opposite, second end portion extending through the second end portion of the booster cylinder and terminating in the assistance cylinder chamber; and a push rod having a first end portion mounted onto the piston plate and an opposite, second end portion extending through the first end portion of the booster cylinder and engageable with a clutch of an automobile. In one embodiment, the push rod and the piston rod are coaxially aligned with the axis of the assistance cylinder or the axis of the booster cylinder. The piston plate is reciprocally movable in the booster cylinder chamber for engaging or disengaging the clutch from the engine of the automobile in response to a force applied to the clutch of the automobile.

The clutch booster also includes a control valve unit located proximately to the first end portion of the assistance cylinder and the second end portion of the booster cylinder and adapted for regulating the pressure of the first chamber portion and the second chamber portion of the booster cylinder in response to the hydraulic fluid pressure in the assistance cylinder chamber. The hydraulic fluid pressure in the assistance cylinder chamber is associated with a force applied to the clutch of the automobile.

In one embodiment, the control valve unit has a supply port in communication with to a source of compressed air for delivering compressed air into the second chamber portion of the booster cylinder; an exhaust port for exhausting air from the second chamber portion of the booster cylinder; an air passageway in communication with the second chamber portion of the booster cylinder and the supply port and the exhaust port; an intake valve in communication with the air passageway and the supply port for operably controlling the flow of air from the supply port to the second chamber portion of the booster cylinder through the air passageway; an exhaust valve in communication with the air passageway and the exhaust port for operably controlling the flow of air from the second chamber portion of the booster cylinder to the atmosphere through the air passageway; a control valve coupled with the intake valve and the exhaust valve for operating the intake valve and the exhaust valve; and a control piston coupled with the assistance cylinder and the control valve and reciprocally moveable between a first position and a second position in response to the hydraulic fluid pressure in the assistance cylinder chamber.

The control valve is configured to be reciprocally moveable between a first position and a second position. When the control valve is in its first position, it causes the intake valve to close and the exhaust valve to open, thereby allowing no air to flow from the supply port to the second chamber portion of the booster cylinder and air to flow from the second chamber portion of the booster cylinder to the atmosphere. When the control valve is in its second position, it causes the intake valve to open and the exhaust valve to close, thereby allowing air to flow from the supply port to the second chamber portion of the booster cylinder and no air to flow from the second chamber portion of the booster cylinder to the atmosphere.

When the hydraulic fluid pressure in the assistance cylinder chamber is zero, the control piston and the control valve are in their corresponding first positions. When the hydraulic fluid pressure in the assistance cylinder chamber increases to a desired value from zero, the control piston moves from its first position toward its second position, thereby causing the control valve to move from its first position toward its second position. When the hydraulic fluid pressure in the assistance cylinder chamber reduces from the desired value to zero, the control piston moves from its second position toward its first position, thereby causing the control valve to move from its second position toward its first position.

In one embodiment, the control valve unit further comprises a returning spring for returning the control piston and the control valve from their corresponding second positions to their corresponding first positions.

Furthermore, the clutch booster includes an electromagnetic solenoid coil attached to the second end portion of the booster cylinder; a ferromagnetic plunger having a first end portion mounted on the second side of the piston plate and an opposite, second end portion extending through the second end portion of the booster cylinder and the electromagnetic solenoid coil and terminating therein; and a sensor coupled with the electromagnetic coil for measuring inductance of the electromagnetic solenoid coil induced by the ferromagnetic plunger, where the inductance is associated with the status of the clutch of the automobile. The ferromagnetic plunger is reciprocally movable in the electromagnetic solenoid coil according to the movement of the piston plate. The ferromagnetic plunger is sealed.

In one embodiment, the electromagnetic solenoid coil is aligned parallel to the axis of the assistance cylinder or the axis of the booster cylinder.

In one embodiment, the sensor includes an inductance pickup or inductance meter. The sensor is coupled to an alarm unit and/or a display unit of the automobile.

In another aspect, the present invention relates to a clutch booster usable for an automobile having a clutch. In one embodiment, the clutch booster has a booster member coupled with the clutch for engaging or disengaging the clutch from the engine of the automobile in response to a force applied to the clutch of the automobile; and means for determining the status of the clutch of the automobile.

In one embodiment, the booster member includes at least one cylinder defined a cylinder chamber therein; a piston plate configured to be positioned in the cylinder chamber to divide the interior thereof into a first chamber portion and a second chamber portion, and being reciprocally moveable in the cylinder chamber in response to the force applied to the clutch of the automobile; and a piston rod having a first end attached onto the piston plate and an opposite, second end attached onto the clutch, and being reciprocally moveable according to the movement of the piston plate for engaging or disengaging the clutch from the engine of the automobile.

In one embodiment, the determining means comprises an electromagnetic solenoid coil attached to the at least one cylinder; a ferromagnetic plunger having a first end portion mounted the piston plate and an opposite, second end portion extending through the electromagnetic solenoid coil, and being reciprocally moveable in the electromagnetic solenoid coil according to the movement of the piston plate; and a sensor coupled with the electromagnetic coil for measuring inductance of the electromagnetic solenoid coil induced by the ferromagnetic plunger, where the inductance is associated with the status of the clutch of the automobile.

In yet another aspect, the present invention relates to a method of determining the status of a clutch of an automobile. In one embodiment, the method includes the step of providing a booster member coupled with a clutch of an automobile.

The booster member has at least one cylinder defining a cylinder chamber therein; a piston plate configured to be positioned in the cylinder chamber to divide the interior thereof into a first chamber portion and a second chamber portion, and being reciprocally moveable in the cylinder chamber in response to the force applied to the clutch of the automobile; and a piston rod having a first end attached onto the piston plate and an opposite, second end attached onto the clutch, and being reciprocally moveable according to the movement of the piston plate for engaging or disengaging the clutch from the engine of the automobile; an electromagnetic solenoid coil attached to the at least one cylinder; and a ferromagnetic plunger having a first end portion mounted the piston plate and an opposite, second end portion extending through the electromagnetic solenoid coil, and being reciprocally moveable in the electromagnetic solenoid coil according to the movement of the piston plate, thereby inducing the inductance in the electromagnetic solenoid coil.

The method further includes the step of detecting the inductance in the electromagnetic solenoid coil, where the inductance is associated with the status of the clutch of the automobile. In one embodiment, the detecting step is performed with an inductance pickup or inductance meter.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
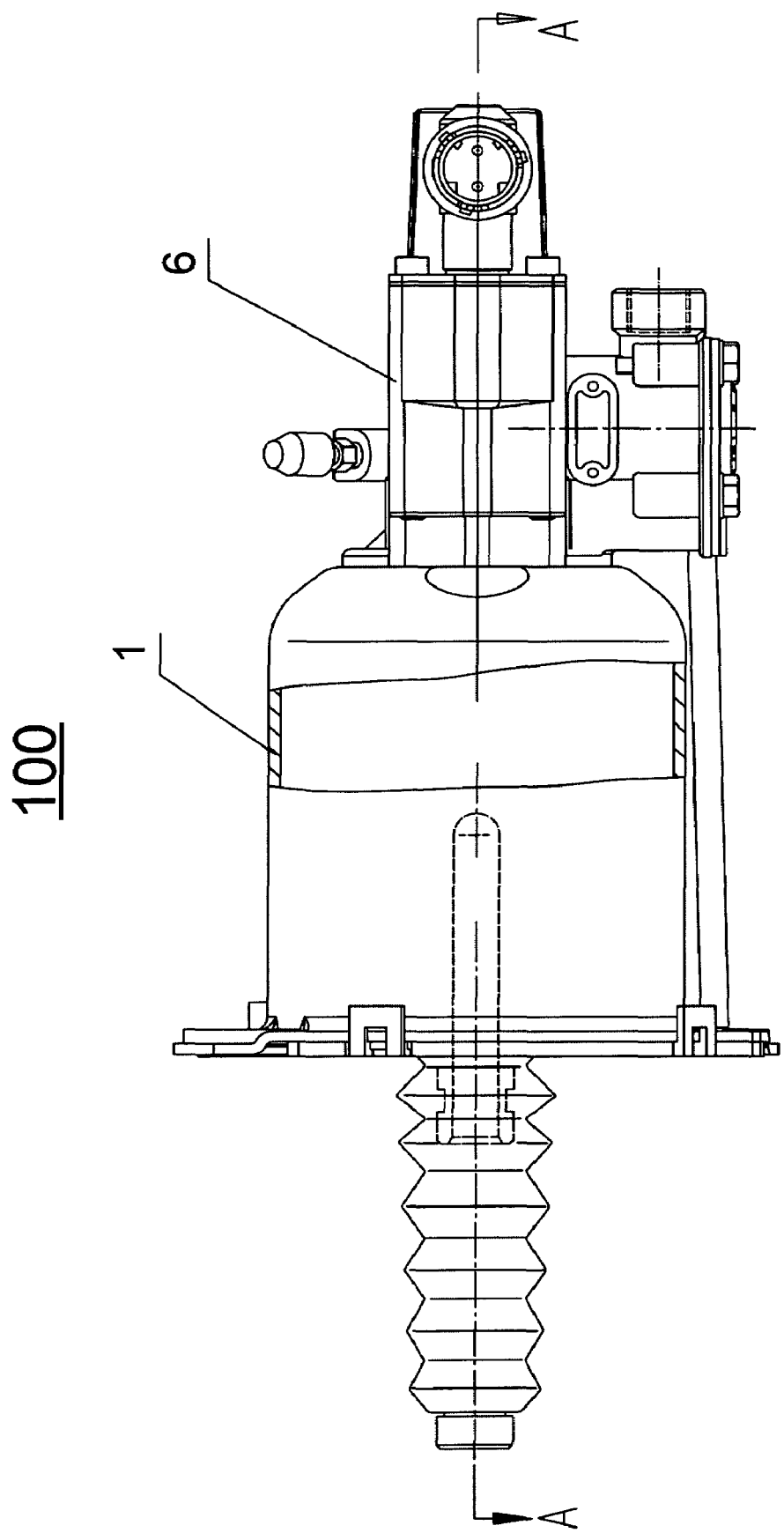
FIG. 1 is an automobile clutch booster according to one embodiment of the present invention.
Figure 2:
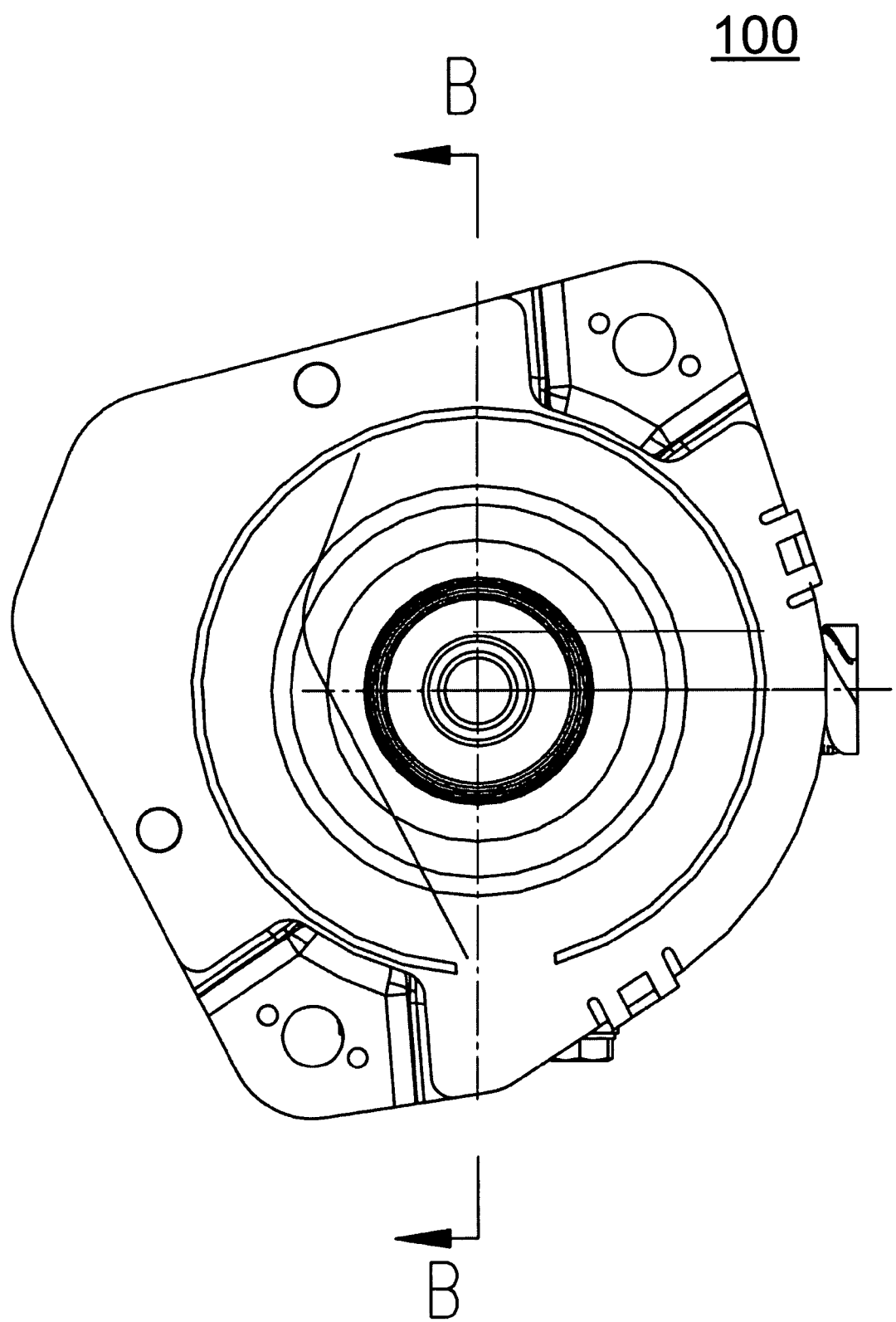
FIG. 2 shows a side view of the automobile clutch booster shown in FIG. 1.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings of FIGS. 1-5. In accordance with the purposes of this invention, as embodied and broadly described herein, this invention, in one aspect, relates to an automobile clutch booster.

Referring to FIGS. 1-5, a clutch booster 100 is shown according to one embodiment of the present invention. The clutch booster 100 is usable for an automobile having a clutch. The clutch booster 100 includes a booster cylinder 1 having a first end portion 1A and an opposite, second end portion 1B defining a booster cylinder chamber 1C therebetween. The booster cylinder 1 also has an axis 1D extending through the booster cylinder 1.

The clutch booster 100 also includes an assistance cylinder 6 having a first end portion 6A and an opposite, second end portion 6B defining an assistance cylinder chamber 6C therebetween. The first end portion 6A of the assistance cylinder 6 is mounted onto the second end portion 1B of the booster cylinder 1 and the second end portion 6B of the assistance cylinder 6 is formed with an opening 9. The second end portion 6B of the assistance cylinder 6 is configured to connect to a hydraulic clutch pump (not shown) such that the assistance cylinder 6 is in fluid communication with the hydraulic clutch pump through the opening 9. The assistance cylinder 6 has an axis 6D. In this embodiment, the axis 6D of the assistance cylinder 6 is substantially coincident with the axis 1D of the booster cylinder 1. As shown in FIGS. 1-4, the assistance cylinder 6 and the booster cylinder 1 are arranged in tandem.

The clutch booster 100 further includes a push rod 10, a piston rod 4 and a push rod 10.

The push rod 10 has a first side 2A and an opposite, second side 2B, and is configured to be positioned in the booster cylinder chamber 1C to divide the booster cylinder chamber 1C into a first chamber portion 3A and a second chamber portion 3. The piston plate 2 is reciprocally movable in the booster cylinder chamber 1C in response to a force applied to the clutch of the automobile. The movement of the piston plate 2 is adapted for engaging or disengaging the clutch from the engine of the automobile.

The piston rod 4 has a first end portion 4A mounted onto the second side 2B of the piston plate 2, and an opposite, second end portion 4B extending through the second end portion 1B of the booster cylinder 1 and terminating in the assistance cylinder chamber 6C. The push rod 10 has a first end portion 10A mounted onto the piston plate 2 and an opposite, second end portion 10B extending through the first end portion 1A of the booster cylinder 1 and engageable with a clutch of an automobile. In the embodiment shown in FIGS. 1-4, the push rod 10 and the piston rod 4 are coaxially aligned with the axis 6D of the assistance cylinder 6 or the axis 1D of the booster cylinder 1.

The clutch booster 100 also includes a control valve unit 21 located proximately to the first end portion 6A of the assistance cylinder 6 and the second end portion 1B of the booster cylinder 1. The control valve unit 21 is adapted for regulating the pressure of the first chamber portion 3A and the second chamber portion 3 of the booster cylinder 1 in response to the hydraulic fluid pressure in the assistance cylinder chamber 6C. The hydraulic fluid pressure in the assistance cylinder chamber 6C is associated with a force applied to the clutch of the automobile.

Figure 4:
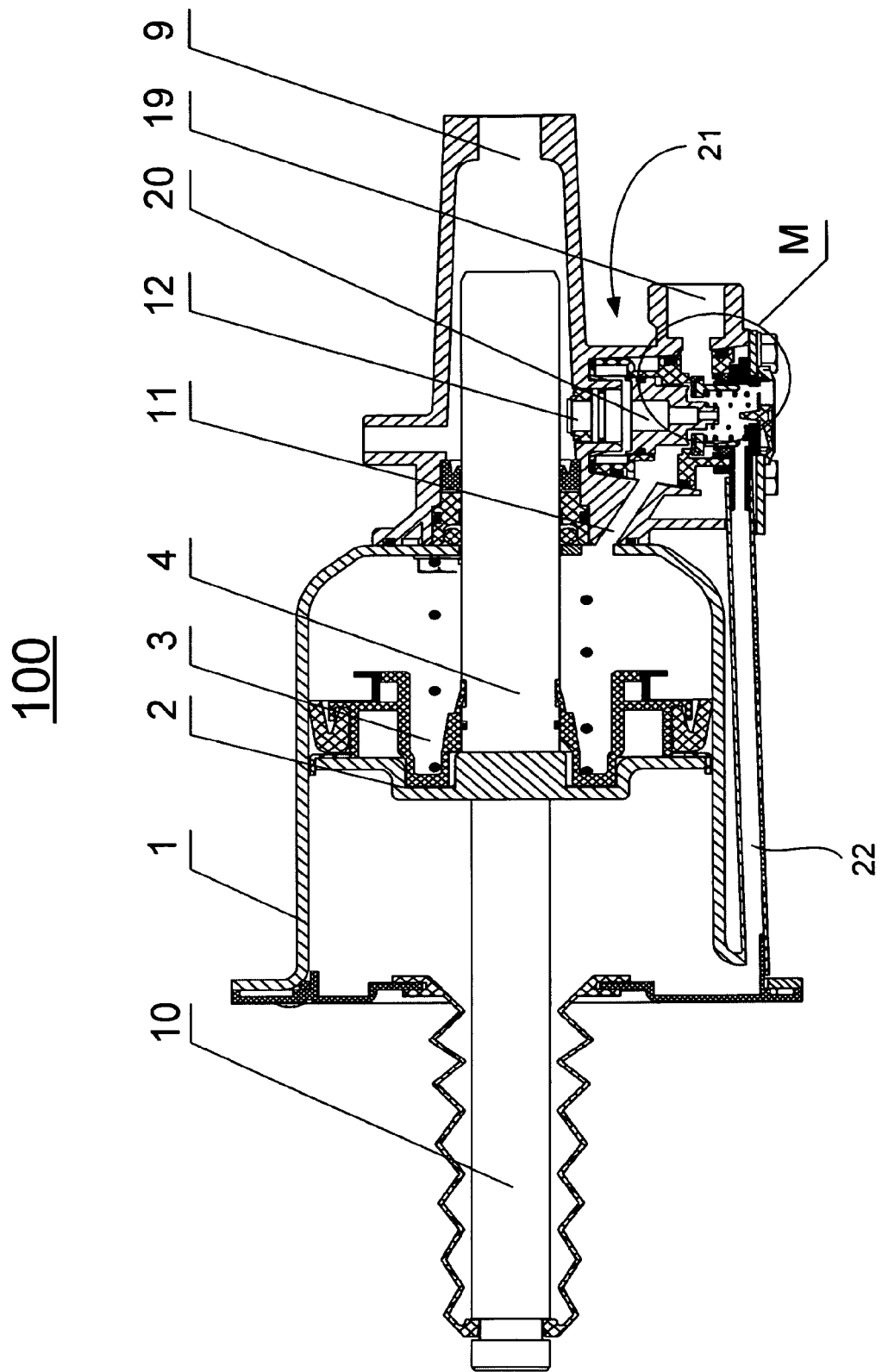
FIG. 4 shows another cross-sectional view of the automobile clutch booster along with the B-B line, as shown in FIG. 2.
Figure 5:
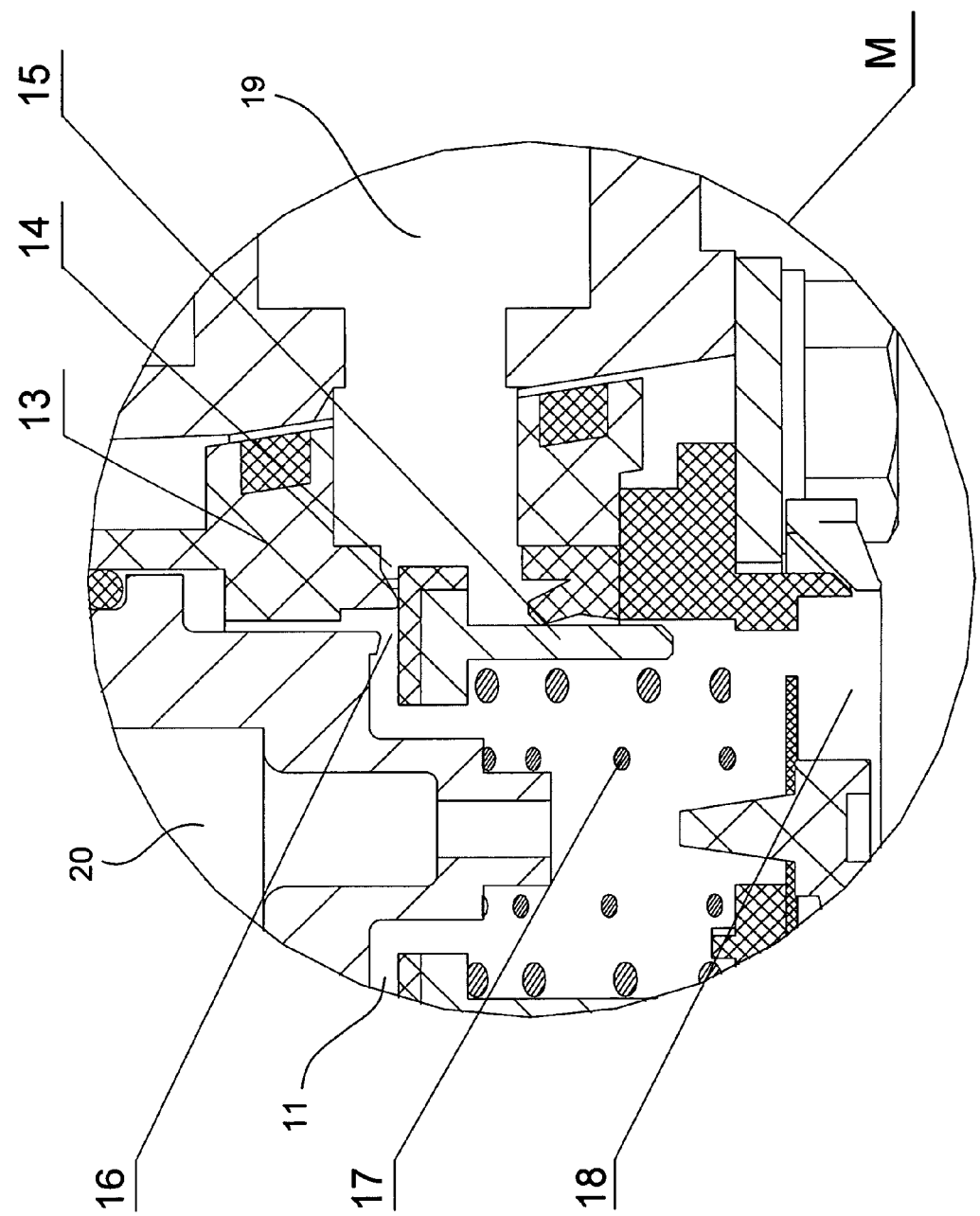
FIG. 5 shows a partially enlarged view of the automobile clutch booster, as shown in FIG. 4.

As shown in FIGS. 4 and 5, the control valve unit 21 has a supply port 19 in communication with a source of compressed air (not shown) for delivering compressed air into the second chamber portion 3 of the booster cylinder 1; an exhaust port 18 for exhausting air from the second chamber portion 3 of the booster cylinder 1; an air passageway 11 in communication with the second chamber portion 3 of the booster cylinder land the supply port 19 and the exhaust port 18; an intake valve 14 in communication with the air passageway 11 and the supply port 19 for operably controlling the flow of air from the supply port 19 to the second chamber portion 3 of the booster cylinder 1 through the air passageway 11; an exhaust valve 16 in communication with the air passageway 11 and the exhaust port 18 for operably controlling the flow of air from the second chamber portion 3 of the booster cylinder 1 to the atmosphere through the air passageway 11; a control valve 15 coupled with the intake valve 14 and the exhaust valve 16 for operating the intake valve 14 and the exhaust valve 16; and a control piston 12 coupled with the assistance cylinder 6 and control valve 15 and configured to be reciprocally moveable between a first position and a second position in response to the hydraulic fluid pressure in the assistance cylinder chamber 6C.

The control valve unit 21 further comprises a returning spring 17 for returning the control piston 12 and the control valve 15 from their corresponding second positions to their corresponding first positions.

The control valve 15 is configured to be reciprocally moveable between a first position and a second position. When the control valve 15 is in its first position, it causes the intake valve 14 to close and the exhaust valve 16 to open, thereby allowing no air to flow from the supply port 19 to the second chamber portion 3 of the booster cylinder 1 and air to flow from the second chamber portion 3 of the booster cylinder 1 to the atmosphere. When the control valve 15 is in its second position, it causes the intake valve 14 to open and the exhaust valve 16 to close, thereby allowing air to flow from the supply port 19 to the second chamber portion 3 of the booster cylinder 1 and no air to flow from the second chamber portion 3 of the booster cylinder 1 to the atmosphere.

In a normal driving condition, the hydraulic fluid pressure in the assistance cylinder chamber 6C is zero, the control piston 12 and the control valve 15 are in their corresponding first positions. Accordingly, the intake valve 14 is close and the exhaust valve 16 is open, such a configuration allows no air to flow from the supply port 19 to the second chamber portion 3 of the booster cylinder 1 and air to flow from the second chamber portion 3 of the booster cylinder 1 to the atmosphere. In this condition, the clutch is engaged with the engine of the automobile.

When a force is applied to the clutch of the automobile, which actuates the hydraulic clutch pump (not shown) to apply fluid from the pump to the assistance cylinder chamber 6C through the opening 9, thereby increasing the hydraulic fluid pressure in the assistance cylinder chamber 6C from zero to a desired value, the force imposed on the control piston 12 in the presence of the hydraulic fluid pressure in the assistance cylinder chamber 6C moves the control piston 12 from its first position toward its second position. As a result, the control valve 15 moves from its first position toward its second position. In this case, the intake valve 14 is open and the exhaust valve 16 is close, which allows air to flow from the supply port 19 to the second chamber portion 3 of the booster cylinder 1 and no air to flow from the second chamber portion 3 of the booster cylinder 1 to the atmosphere. The volume of the second chamber portion 3 of the booster cylinder 1 is thus expanded. Accordingly, the force imposed on the piston rod 4 in the presence of the hydraulic fluid pressure in the assistance cylinder chamber 6C and the force imposed on the piston plate 2 due to the volume expansion of the second chamber portion 3 together force the piston plate 2 to move in the booster chamber along a first direction from the second end portion 1B to the first end portion 1A of the booster cylinder 1. Such a movement of the piston plate 2 causes the push rod 10 to move along the first direction as well. Therefore, the moving distance of the push rod 10 is associated with the amount of the force applied to the clutch of the automobile. By applying a predetermined amount of the force to the clutch, the push rod 10 moves in a desired moving distance, thereby disengaging the clutch from the engine of the automobile.

When the force applied to the clutch is released, the hydraulic clutch pump is de-actuated. Consequently, the fluid in the assistance cylinder chamber 6C flows to the pump through the opening 9, thereby reducing the hydraulic fluid pressure in the assistance cylinder chamber 6C from the desired value to zero. In this instance, the expanding force of the returning spring 17 acts on the control piston 12 and the control valve 15 to push them to their corresponding first positions. Accordingly, the intake valve 14 is close and the exhaust valve 16 is open, such a configuration allows no air to flow from the supply port 19 to the second chamber portion 3 of the booster cylinder 1 and air to flow from the second chamber portion 3 of the booster cylinder 1 to the atmosphere. In this case, the expanding force of a spring (not shown) of the clutch causes the piston plate 2 to move in the booster chamber 1C along a second direction that is opposite to the first direction, which causes the clutch to engage with the engine of the automobile.

Furthermore, the clutch booster 100 includes an electromagnetic solenoid coil 7 attached to the second end portion 1B of the booster cylinder 1 and a ferromagnetic plunger 5 having a first end portion 5A mounted on the second side 2B of the piston plate 2 and an opposite, second end portion SB extending through the second end portion 1B of the booster cylinder 1 and the electromagnetic solenoid coil 7 and terminating therein. As shown in FIG. 4, the electromagnetic solenoid coil 7 is aligned parallel to the axis 6D of the assistance cylinder 6 or the axis 1D of the booster cylinder 1. In operation, the ferromagnetic plunger 5 passes through the second chamber portion 3 of the booster chamber 1, preferably, the ferromagnetic plunger 5 is sealed. The ferromagnetic plunger 5 is configured to reciprocally move in the electromagnetic solenoid coil 7 according to the movement of the piston plate 2. When the ferromagnetic plunger 5 is moving in the electromagnetic solenoid coil 7, it induces the inductance in the electromagnetic solenoid coil 7. The amount of the inductance induced in the electromagnetic solenoid coil 7 is associated with the length of the ferromagnetic plunger 5 inside the electromagnetic solenoid coil 7. For a normal clutch, when it is engaged with the engine of the automobile, the length of the ferromagnetic plunger 5 inside the electromagnetic solenoid coil 7 is fixed, therefore the inductance induced in the electromagnetic solenoid coil 7 has a fixed value. If the inductance is detected to have a value different from the fixed value, the clutch of the automobile appears to be worn. By calibrating the clutch booster, the detected inductance can be well associated with the degree of the clutch wearing.

Figure 3:
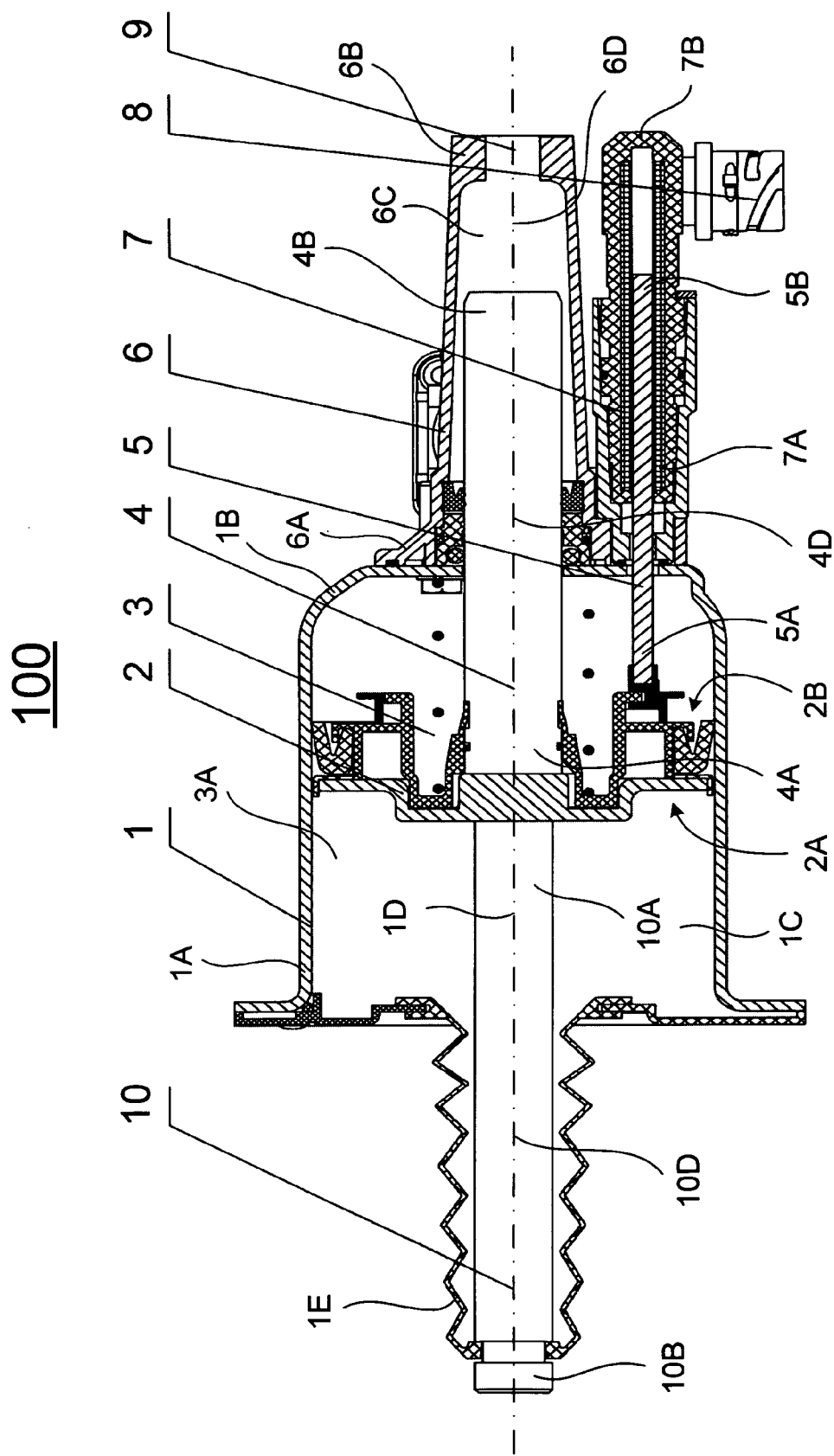
FIG. 3 shows a cross-sectional view of the automobile clutch booster along with the A-A line, as shown in FIG. 1.

As shown in FIG. 3, a sensor 8 coupled with the electromagnetic coil 7 is adapted for measuring the inductance of the electromagnetic solenoid coil 7 induced by the ferromagnetic plunger 5. The sensor 8 includes an inductance pickup or inductance meter.

The sensor 8 is coupled to an alarm unit and/or a display unit of the automobile for alerting and/or of the clutch wearing. In addition, by processing the detected inductance of the electromagnetic solenoid coil 7, the driver may be indicated where the clutch is an optimal position for engaging with the engine of the automobile.

Another aspect of the present invention provides a method of determining the status of a clutch of an automobile. In one embodiment, the method includes the step of providing a booster member coupled with a clutch of an automobile.

The booster member has at least one cylinder defined a cylinder chamber therein; a piston plate configured to be positioned in the cylinder chamber to divide the interior thereof into a first chamber portion and a second chamber portion, and being reciprocally moveable in the cylinder chamber in response to the force applied to the clutch of the automobile; and a piston rod having a first end attached onto the piston plate and an opposite, second end attached onto the clutch, and being reciprocally moveable according to the movement of the piston plate for engaging or disengaging the clutch from the engine of the automobile; an electromagnetic solenoid coil attached to the at least one cylinder; and a ferromagnetic plunger having a first end portion mounted the piston plate and an opposite, second end portion extending through the electromagnetic solenoid coil, and being reciprocally moveable in the electromagnetic solenoid coil according to the movement of the piston plate, thereby inducing the inductance in the electromagnetic solenoid coil.

The method further includes the step of detecting the inductance in the electromagnetic solenoid coil, wherein the inductance is associated with the status of the clutch of the automobile. In one embodiment, the detecting step is performed with an inductance pickup or inductance meter.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A clutch booster usable for an automobile having a clutch, comprising:

a. a booster cylinder having a first end portion and an opposite, second end portion defining a booster cylinder chamber therebetween;

b. an assistance cylinder having a first end portion and an opposite, second end portion defining an assistance cylinder chamber therebetween, wherein the first end portion is mounted onto the second end portion of the booster cylinder and the second end portion is formed with an opening;

c. a piston plate having a first side and an opposite, second side, configured to be positioned in the booster cylinder chamber to divide the booster cylinder chamber into a first chamber portion and a second chamber portion;

d. a piston rod having a first end portion mounted onto the second side of the piston plate, and an opposite, second end portion extending through the second end portion of the booster cylinder and into the assistance cylinder chamber;

e. a push rod having a first end portion mounted onto the piston plate and an opposite, second end portion extending through the first end portion of the booster cylinder and engageable with a clutch of an automobile;

f. a control valve unit located proximately to the first end portion of the assistance cylinder and the second end portion of the booster cylinder and adapted for regulating the pressure of the first chamber portion and the second chamber portion of the booster cylinder in response to the hydraulic fluid pressure in the assistance cylinder chamber;

g. an electromagnetic solenoid coil attached to the second end portion of the booster cylinder;

h. a ferromagnetic plunger having a first end portion mounted on the second side of the piston plate and an opposite, second end portion extending through the second end portion of the booster cylinder and into the electromagnetic solenoid coil; and i. a sensor electrically coupled with the electromagnetic coil for measuring inductance of the electromagnetic solenoid coil induced by the ferromagnetic plunger, wherein the inductance is associated with the status of the clutch of the automobile.

2. The clutch booster of claim 1, wherein the assistance cylinder and the booster cylinder are arranged in tandem.

3. The clutch booster of claim 1, wherein the booster cylinder has an axis, and wherein the assistance cylinder has an axis substantially coincident with the axis of the booster cylinder.

4. The clutch booster of claim 3, wherein the push rod and the piston rod are coaxially aligned with the axis of the assistance cylinder or the axis of the booster cylinder.

5. The clutch booster of claim 3, wherein the electromagnetic solenoid coil is aligned parallel to the axis of the assistance cylinder or the axis of the booster cylinder.

6. The clutch booster of claim 1, wherein the control valve unit comprises:

a. a supply port for delivering compressed air into the second chamber portion of the booster cylinder;

b. an exhaust port for exhausting air from the second chamber portion of the booster cylinder;

c. an air passageway in communication with the second chamber portion of the booster cylinder and the supply port and the exhaust port;

d. an intake valve in communication with the air passageway and the supply port for operably controlling the flow of air from the supply port to the second chamber portion of the booster cylinder through the air passageway;

e. an exhaust valve in communication with the air passageway and the exhaust port for operably controlling the flow of air from the second chamber portion of the booster cylinder to the atmosphere through the air passageway;

f. a control valve coupled with the intake valve and the exhaust valve for operating the intake valve and the exhaust valve; and g. a control piston coupled with the assistance cylinder 6 and the control valve and reciprocally moveable between a first position and a second position in response to the hydraulic fluid pressure in the assistance cylinder chamber.

7. The clutch booster of claim 6, wherein the control valve is configured to be reciprocally moveable between a first position and a second position, a. wherein when the control valve is in its first position, it causes the intake valve to close and the exhaust valve to open, thereby allowing no air to flow from the supply port to the second chamber portion of the booster cylinder, and air to flow from the second chamber portion of the booster cylinder to the atmosphere; and b. wherein when the control valve is in its second position, it causes the intake valve to open and the exhaust valve to close, thereby allowing air to flow from the supply port to the second chamber portion of the booster cylinder, and no air to flow from the second chamber portion of the booster cylinder to the atmosphere.

8. The clutch booster of claim 7, wherein the control valve unit further comprises a returning spring for returning the control piston and the control valve from their corresponding second positions to their corresponding first positions.

9. The clutch booster of claim 8, wherein when the hydraulic fluid pressure in the assistance cylinder chamber is zero, the control piston and the control valve are in their corresponding first positions, wherein when the hydraulic fluid pressure in the assistance cylinder chamber increases to a desired value from zero, the control piston moves from its first position toward its second position, thereby causing the control valve to move from its first position toward its second position; and wherein when the hydraulic fluid pressure in the assistance cylinder chamber reduces from the desired value to zero, the control piston moves from its second position toward its first position, thereby causing the control valve to move from its second position toward its first position.

10. The clutch booster of claim 9, wherein the hydraulic fluid pressure in the assistance cylinder chamber is associated with a force applied to the clutch of the automobile.

11. The clutch booster of claim 10, wherein the piston plate is configured to be reciprocally movable in the booster cylinder chamber for engaging or disengaging the clutch from the engine of the automobile in response to a force applied to the clutch of the automobile.

12. The clutch booster of claim 11, wherein the ferromagnetic plunger is configured to be reciprocally movable in the electromagnetic solenoid coil according to the movement of the piston plate.

13. The clutch booster of claim 1, wherein the ferromagnetic plunger is sealed.

14. The clutch booster of claim 1, wherein the sensor comprises an inductance pickup or inductance meter.

15. The clutch booster of claim 1, wherein the sensor is coupled to an alarm unit and/or a display unit of the automobile.

16. A clutch booster usable for an automobile having a clutch, comprising:

a booster member coupled with the clutch for engaging or disengaging the clutch from the engine of the automobile in response to a force applied to the clutch of the automobile; and an electronic member configured to determine the status of the clutch of the automobile, wherein the electromagnetic member comprises:
a. an electromagnetic solenoid coil attached to the at least one cylinder;
b. a ferromagnetic plunger having a first end portion mounted the piston plate and an opposite, second end portion extending through the electromagnetic solenoid coil, and being reciprocally moveable in the electromagnetic solenoid coil according to the movement of the piston plate; and
c. a sensor coupled with the electromagnetic coil for measuring inductance of the electromagnetic solenoid coil induced by the ferromagnetic plunger, wherein the inductance is associated with the status of the clutch of the automobile.

17. The clutch booster of claim 16, wherein the booster member comprises:
a. at least one cylinder defined a cylinder chamber therein;
b. a piston plate configured to be positioned in the cylinder chamber to divide the interior thereof into a first chamber portion and a second chamber portion, and being reciprocally moveable in the cylinder chamber in response to the force applied to the clutch of the automobile; and
c. a piston rod having a first end attached onto the piston plate and an opposite, second end attached onto the clutch, and being reciprocally moveable according to the movement of the piston plate for engaging or disengaging the clutch from the engine of the automobile.

18. A method of determining the status of a clutch of an automobile, comprising the steps of:
a. providing a booster member coupled with a clutch of an automobile, comprising:
(i) at least one cylinder defining a cylinder chamber therein;
(ii) a piston plate configured to be positioned in the cylinder chamber to divide the interior thereof into a first chamber portion and a second chamber portion, and being reciprocally moveable in the cylinder chamber in response to the force applied to the clutch of the automobile; and
(iii) a piston rod having a first end attached onto the piston plate and an opposite, second end attached onto the clutch, and being reciprocally moveable according to the movement of the piston plate for engaging or disengaging the clutch from the engine of the automobile;
(iv) an electromagnetic solenoid coil attached to the at least one cylinder; and
(v) a ferromagnetic plunger having a first end portion mounted the piston plate and an opposite, second end portion extending through the electromagnetic solenoid coil, and being reciprocally moveable in the electromagnetic solenoid coil according to the movement of the piston plate, thereby inducing the inductance in the electromagnetic solenoid coil; and
b. detecting inductance of the electromagnetic solenoid coil induced by the ferromagnetic plunger, wherein the inductance is associated with the status of the clutch of the automobile.

19. The method of claim 18, wherein the detecting step is performed with an inductance pickup or inductance meter.

* * * * *